US012182769B2

(12) United States Patent
Singh et al.

(10) Patent No.: US 12,182,769 B2
(45) Date of Patent: *Dec. 31, 2024

(54) CONFIGURABLE SETTINGS FOR AUTOMATIC UPDATES OF CALENDAR ITEMS

(71) Applicant: Microsoft Technology Licensing, LLC, Redmond, WA (US)

(72) Inventors: Jaskaran Singh, Redmond, WA (US); Julia Foran Schearer, Seattle, WA (US); Jaya Matthew, Seattle, WA (US); Dipak Sarjerao Pawar, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

This patent is subject to a terminal disclaimer.

(21) Appl. No.: 17/855,627

(22) Filed: Jun. 30, 2022

(65) Prior Publication Data

US 2022/0351153 A1 Nov. 3, 2022

Related U.S. Application Data

(63) Continuation of application No. 15/921,550, filed on Mar. 14, 2018, now Pat. No. 11,526,853.

(51) Int. Cl.
*G06Q 10/00* (2023.01)
*G06Q 10/109* (2023.01)
*G06Q 10/1093* (2023.01)

(52) U.S. Cl.
CPC ....... *G06Q 10/1095* (2013.01); *G06Q 10/109* (2013.01)

(58) Field of Classification Search
CPC ................................. G06Q 10/1095
See application file for complete search history.

(56) References Cited

U.S. PATENT DOCUMENTS

2009/0248480 A1 10/2009 Milksovsky et al.
2014/0288990 A1* 9/2014 Moore ............... G06Q 10/1093
705/7.19

(Continued)

FOREIGN PATENT DOCUMENTS

CN 101178794 A 5/2008
WO 2016054629 A1 4/2016

OTHER PUBLICATIONS

Go. K. Sahingoz, "Agent based meeting scheduling in hierarchical organizations," 2010 International Symposium on Information Technology, Kuala Lumpur, Malaysia, 2010, pp. 1519-1524, doi: 10.1109/ITSIM.2010.5561474. (Year: 2010).*

(Continued)

*Primary Examiner* — Matheus Ribeiro Stivaletti
(74) *Attorney, Agent, or Firm* — NovoTechIP International PLLC

(57) ABSTRACT

Techniques of configuring settings for automatic update of calendar items in an electronic calendar systems are disclosed herein. In one embodiment, a server can receive and store update configuration records indicating that a change to a start date, start time, an end date, an end time, or location of a meeting would render a meeting update actionable. Upon receiving an incoming meeting update, the server can determine whether the incoming meeting update contains a change to one of a start date, start time, an end date, an end time or location. If true, the server can automatically modify, without any input from the recipient, a scheduled meeting appointment in the calendar folder of the recipient according to the received incoming meeting update.

20 Claims, 8 Drawing Sheets

(56) References Cited

U.S. PATENT DOCUMENTS

2015/0193392 A1* 7/2015 Greenblatt .......... G06Q 10/109
                                                    715/205
2017/0109705 A1* 4/2017 Guerra ............... G06Q 10/1095
2018/0189744 A1* 7/2018 Frank ................. G06F 21/6218

OTHER PUBLICATIONS

First Office Action received for Chinese Application No. 201980019119.4, mailed on Dec. 11, 2023, 10 pages.
"Office Action Issued in European Patent Application No. 19712418.3", Mailed Date: Jul. 19, 2022, 8 Pages.
"Office Action Issued in Indian Patent Application No. 202047039076", Mailed Date: Jun. 27, 2022, 7 Pages.
"Office Action Issued in Indian Patent Application No. 202047039098", Mailed Date: Jul. 12, 2022, 5 Pages.
"Office Action Issued in European Patent Application No. 19712652.7", Mailed Date: May 2, 2022, 8 Pages.
Office Action Received for Chinese Application No. 201980019119.4, mailed on Aug. 23, 2024, 4 pages (English Translation Provided).

* cited by examiner

CONFIGURABLE SETTINGS FOR AUTOMATIC UPDATES OF CALENDAR ITEMS

CROSS-REFERENCE TO RELATED APPLICATION

This application claims the benefit of priority from pending U.S. patent application Ser. No. 15/921,550, filed on Mar. 14, 2018, and entitled "Configurable Settings for Automatic Updates of Calendar Items." The entire contents of the above-referenced application is incorporated herein by reference.

BACKGROUND

Electronic calendars are software applications designed to provide users with an electronic version of a physical calendar. Such software applications typically provide an appointment book, an address book, and a contact list. For example, an electronic appointment book can provide functionalities such as transmitting electronic meeting invitations, receiving and notifying newly received meeting invitations, and mechanisms for accepting, rejecting, or proposing new date/time for received meeting invitations. Once a meeting invitation is accepted, the electronic appointment book can also save the meeting as a calendar item and track a current date/time in order to provide reminders for the scheduled meeting.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Electronic calendar systems can facilitate scheduling meetings, recording reminders, or performing other suitable calendaring functions. For instance, a meeting organizer can utilize an electronic calendar system to generate and transmit electronic meeting invitations to meeting invitees via, for instance, emails. The meeting invitations can include a start date/time, an end date/time, a location, a subject of discussion, a list of invitees, one or more attached documents, or other suitable meeting details. Upon acceptance of the meeting invitations by the meeting invitees, the electronic calendar system can store a meeting appointment with the meeting details as a calendar item in each meeting invitee's electronic appointment books.

Such meeting appointments and other suitable types of calendar items may be subject to updates from time to time. For instance, the meeting organizer can modify one or more of the meeting details of a scheduled meeting after the meeting invitations have been transmitted to the meeting invitees and/or the meeting invitees have accepted the meeting invitations. The meeting organizer can request modifications of the location, start date/time, end date/time, description, agenda, and/or other details of the scheduled meeting. Upon receiving the modifications, the electronic calendar system can generate and transmit to each of the meeting invitees a meeting update reflecting the modified meeting details.

In certain electronic calendar systems, all meeting updates are transmitted as emails to each meeting invitee's email inbox for action by the meeting invitees. Upon the meeting invitees' acceptance, the electronic calendar system can update the previous stored calendar items in each meeting invitee's electronic calendar book. Such updating technique, however, can have certain drawbacks. For example, a meeting invitee may be using a client device (e.g., a smartphone) that lacks capability or functionality to accept the meeting update. The meeting invitee may also have difficulty to ascertain which part of the meeting details have changed. In addition, such meeting updates can create clutters in the email inboxes of meeting invitees and heavy workloads for corresponding email servers.

Several embodiments of the disclosed technology can address at least some of the foregoing drawbacks by implementing a selective update engine in an electronic calendar system. The selective update engine can be configured to determine whether a meeting update is actionable or by a meeting invitee upon arrival of the meeting update in an email folder of the meeting invitee. In certain implementations, a meeting update is actionable when the electronic calendar system needs input from the meeting invitee in order to process the meeting update. For example, a meeting update is actionable when the meeting update specifically mentions or requests the meeting invitee for input. In another example, a meeting update is actionable when one or more "critical" meeting details have been modified. Such critical meeting details can include, for instance, a start date/time, an end date/time, etc. The critical meeting details can be pre-configured by, for example, a system administrator, or can be configurable by the meeting invitees or other suitable entities.

Upon determining that the meeting update is not actionable, the selective update engine can automatically update the previously stored calendar item in the electronic calendar book without input from the meeting invitee. The selective update engine can also automatically delete the received meeting update from the email folder of the meeting invitee, for example, by moving the received meeting update to a "Deleted Items" folder. On the other hand, upon determining that the meeting update is actionable, the selective update engine can be configured to deliver the received meeting update, for example, as an email to an inbox in the email folder of the meeting invitee for further action.

Several embodiments of the disclosed technology can improve efficiencies in updating calendar items in electronic appointment books by filtering received messages of meeting updates according to one or more configurable actionability criteria. When a meeting update only contains a modification of non-critical meeting details, the selective update engine can automatically incorporate the modification in the stored calendar item without input from the meeting invitees. Thus, a lack of capability to accept the meeting update on a client device can be obviated. In addition, by automatically deleting at least some of the received meeting updates, several embodiments of the disclosed technology can reduce clutter in email inboxes of meeting invitees as well as reducing workloads of corresponding email servers. Thus, performance of email servers and/or corresponding email services can be improved.

DETAILED DESCRIPTION

Figure 1A:
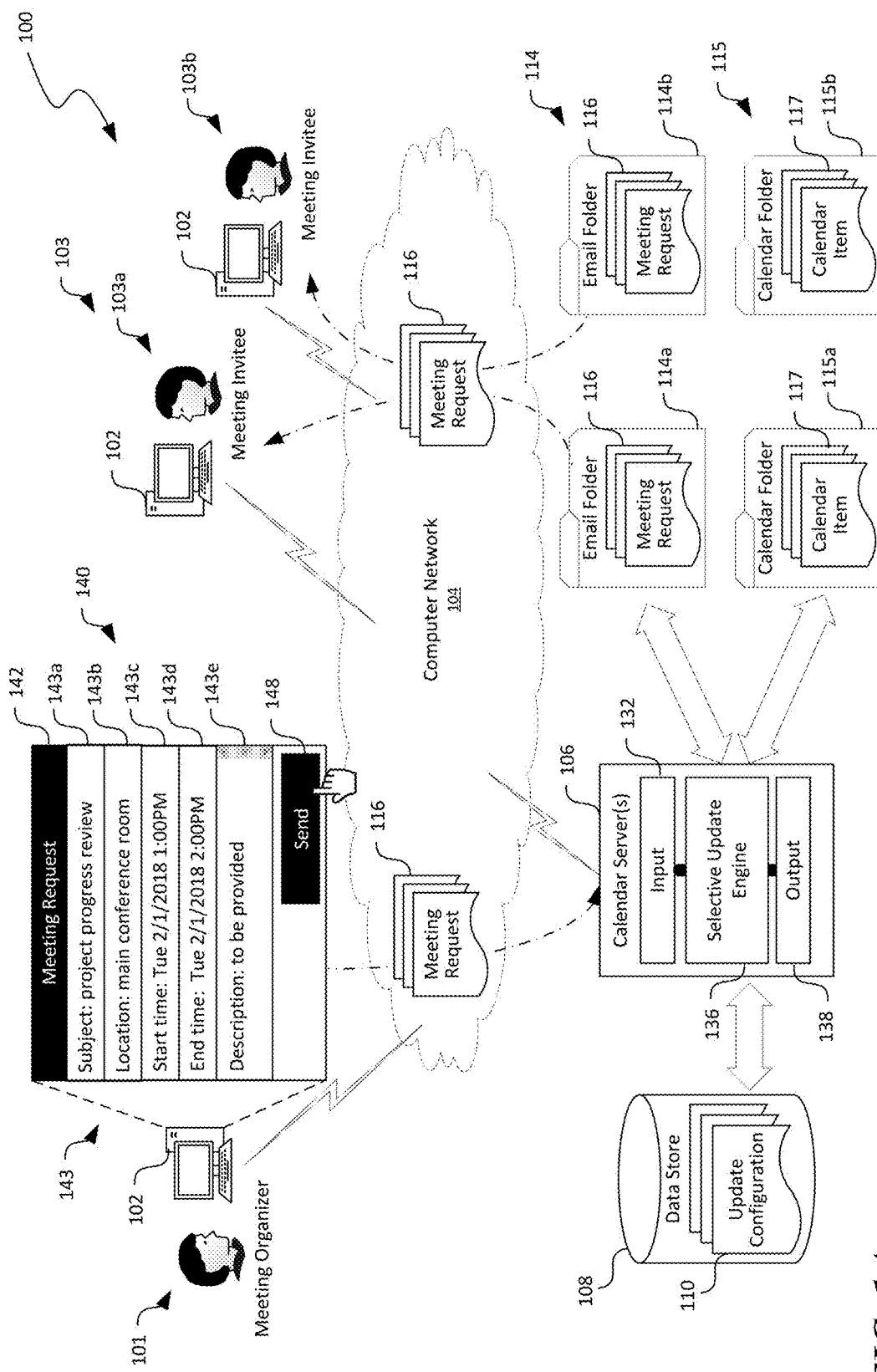
FIGS. 1A-1D are schematic diagrams illustrating an electronic calendar system implementing selective update of calendar items during certain operation stages in accordance with embodiments of the disclosed technology.

Certain embodiments of systems, devices, components, modules, routines, data structures, and processes for selective update of calendar items in computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1A-5.

As used herein, the term "calendar server" generally refers to computer or server dedicated to running such software applications that are configured to provide an electronic version of a physical calendar to one or more users. Such applications typically can provide an email folder, an appointment book, an address book, and a contact list. For example, such applications can provide functionalities such as generating electronic meeting invitations/updates, receiving and notifying newly received meeting invitations, and mechanisms for accept, reject, or proposed new date/time for any received meeting invitations. Examples of such applications include Microsoft Exchange®, qmail, Exim, and sendmail. A calendar server can also be configured to provide a calendar folder for a user. The calendar folder can contain data representing calendar items such as meeting appointments, reminders, etc. The calendar folder can also be synchronized with a corresponding local calendar folder on a client device accessible by a user via a computer network such as the Internet.

Also used herein, the term "meeting invitation" generally refers to a digital data package containing data representing a request for a meeting with one or more invitees or other suitable types of user. A meeting request can contain structured or non-structured data representing various data fields. For instance, example data fields can include identification of a meeting organizer, a start date/time, an end date/time, a location, a meeting description, or other suitable parameters or details of a meeting. As used herein, the term "meeting update" generally refers to a digital data packet containing data representing one or more changes to a start date/time, an end date/time, a location, a meeting description, or other suitable parameters or details of a meeting.

In certain electronic calendar systems, all meeting updates are transmitted as emails to each meeting invitee's email inbox for action by the meeting invitees. Such updating technique, however, can have certain drawbacks. For example, a meeting invitee may be using a client device that lacks capability to accept the meeting update. The meeting invitee may also have difficulty to ascertain which part of the meeting details have changed. In addition, such meeting updates can create clutters in the meeting invitees' inboxes as well as create heavy workloads for email servers of the meeting invitees.

Several embodiments of the disclosed technology are directed to a selective update engine implemented in an electronic calendar system to filter received meeting updates. The selective update engine can determine whether a particular meeting update is actionable by a meeting invitee based on a set of pre-configured criteria or rules. For example, a meeting update is actionable when the meeting update specifically mentions or requests the meeting invitee for input. In another example, a meeting update is actionable when one or more "critical" meeting details, for instance, a start date/time or an end date/time, have been modified. The critical meeting details can be pre-configured by, for example, a system administrator, or can be configurable by the meeting invitees or other suitable entities.

For meeting updates determined to be not actionable, the selective update engine can automatically update the previously stored calendar item in the electronic calendar book without input from the meeting invitee. The selective update engine can also delete the received meeting update from the email folder of the meeting invitee, for example, by moving the received meeting update to a "Deleted Items" folder. As such, not all meeting updates are directly forwarded to the inbox of the meeting invitee. As a result, a lack of capability to accept the meeting update on a client device can be obviated. In addition, by automatically deleting at least some of the received meeting updates, clutter in the inbox of meeting invitee as well as workloads of corresponding email servers can be reduced. Thus, performance of email servers and/or corresponding email services can be improved, as described in more detail below with reference to FIGS. 1A-5.

FIGS. 1A-1D are schematic diagrams illustrating a computing system 100 implementing intelligent management of calendar items during certain operation stages in accordance with embodiments of the disclosed technology. In FIG. 1A and in other FIGURES herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 1A, the computing system 100 can include a computer network 104 interconnecting client devices 102 with one or more calendar servers 106. The client devices 102 can individually correspond to a meeting organizer 101 and one or more meeting invitees 103. Two meeting invitees 103a and 103b are shown in FIGS. 1A-1D for illustration purposes though the computing system 100 can be configured to accommodate any suitable number of meeting invitees 103. The computer network 104 can include an intranet, a wide area network, the Internet, or other suitable types of network.

The calendar server 106 is interconnected with email folders 114a and 114b and calendar folders 115a and 115b individually corresponding to the meeting invitees 103. The calendar server 106 can also be interconnected to a data store 108 containing one or more records of update configuration 110 individually having data representing a set of pre-configured actionality criteria each identifying conditions under which input from a meeting invitee is needed to process a meeting update at the calendar server 106. In certain embodiments, the update configuration 110 can be pre-configured by a system administrator (not shown). In other embodiments, the meeting invitees 103 can configure at least some of the update configuration 110 via a user interface provided by the calendar server 106. An example user interface is described below in more detail with reference to FIG. 2.

Even though particular components of the computing system 100 are shown in FIG. 1A, in other embodiments, the computing system 100 can also include additional and/or different components or arrangements. For example, in certain embodiments, the computing system 100 can also include additional network storage devices, additional servers, and/or other suitable components (not shown). In other embodiments, the data store 108 may be integrated into the calendar server 106.

The client devices 102 can each include a computing device that facilitates corresponding meeting organizer 101 or meeting invitees 103 to access computing services provided by the calendar server 106 via the computer network 104. For example, in the illustrated embodiment, the client devices 102 individually include a desktop computer configured to execute suitable instructions to provide a web page, an email client, a calendar client, a contact list, or other suitable computing services. In other embodiments, the client devices 102 can also include laptop computers, tablet computers, smartphones, or other suitable computing devices.

In accordance with aspects of the disclosed technology, the calendar server 106 can be configured to filter received meeting updates 118 (shown in FIG. 1B) and automatically update corresponding calendar items based on pre-configured actionability criteria contained in the update configuration 110. As shown in FIG. 1A, the calendar server 106 can include one or more processors 304 (shown in FIG. 5) and a memory 306 (shown in FIG. 5) containing instructions executable by the one or more processors to cause the calendar server 106 to provide an input component 132, a selective update engine 136, and an output component 138 operatively coupled to one another. Though particular components of the calendar server 106 are shown in FIG. 1A, in other embodiments, the calendar server 106 can also include network interface components, database management components, or other suitable types of components.

The input component 132 can be configured to receive a meeting request 116 from the meeting organizer 101 via the client device 102 and the computer network 104. As shown in FIG. 1A, in certain embodiments, the meeting organizer 101 can generate and transmit a meeting request 116 via a user interface 142 displayed on the client device 102. The user interface 142 can be a part of a web page of a calendar service (e.g., Google Calendar®) or a part of a calendar client (e.g., Microsoft Outlook®). In other embodiments, the meeting organizer 101 can generate and transmit a meeting request 116 via an application on a mobile device, or in other suitable manners.

The user interface 142 can include multiple data fields 143 containing parameters or details of a requested meeting configurable by the meeting organizer 101. In the example illustrated in FIG. 1A, the data fields 143 include a subject field 143a (i.e., "project progress review"), a location field 143b (i.e., "main conference room"), a start time field 143c (i.e., 37 Tue Feb. 1, 2018 1:00 PM), an end time field 143d (i.e., "Tue Feb. 1, 2018 2:00 PM), and a description field 143e (i.e., "to be provided"). The user interface 142 can also include an actuation element (e.g., "Send" button 148) actuation of which can cause a web service or application corresponding to the user interface 142 to generate and transmit a meeting request 116 with the foregoing parameters or details. In other embodiments, the user interface 142 can also include data fields 143 for configuring reminder periods, time zones, meeting notes, or other suitable parameters.

The input component 132 can then be configured to receive and optionally pre-process the received meeting request 116. For instance, in certain embodiments, the input component 132 can be configured to authenticate the meeting request 116 based on digital certificate attached to the meeting request 116. In other embodiments, the input component 132 can be configured to determine whether the meeting request 116 is actually from the meeting organizer 101 based on, for example, a public key of the meeting organizer 101. In further embodiments, the input component 132 can also be configured to verify that the meeting request 116 is in an acceptable data format, contains necessary data values, and/or perform other suitable operations on the meeting request 116. Upon completion of optional pre-processing, the input component 132 can forward the meeting request 116 to the email folders 114 and client devices 102 of the meeting invitees 103, as shown in FIG. 1A.

Also shown in FIG. 1A, upon the meeting invitees 103 accepting the meeting request 116, for example, by providing input to the client device 102, the output component 138 can be configured to create and store a calendar item 117 in the calendar folders 115 of the respective meeting invitees 103. The calendar items 117 can each include the values contained in the multiple data fields 143 that is included in the meeting request 116 as well as reminders, classifications, categories, or other suitable information regarding the calendar items 117.

Figure 1B:
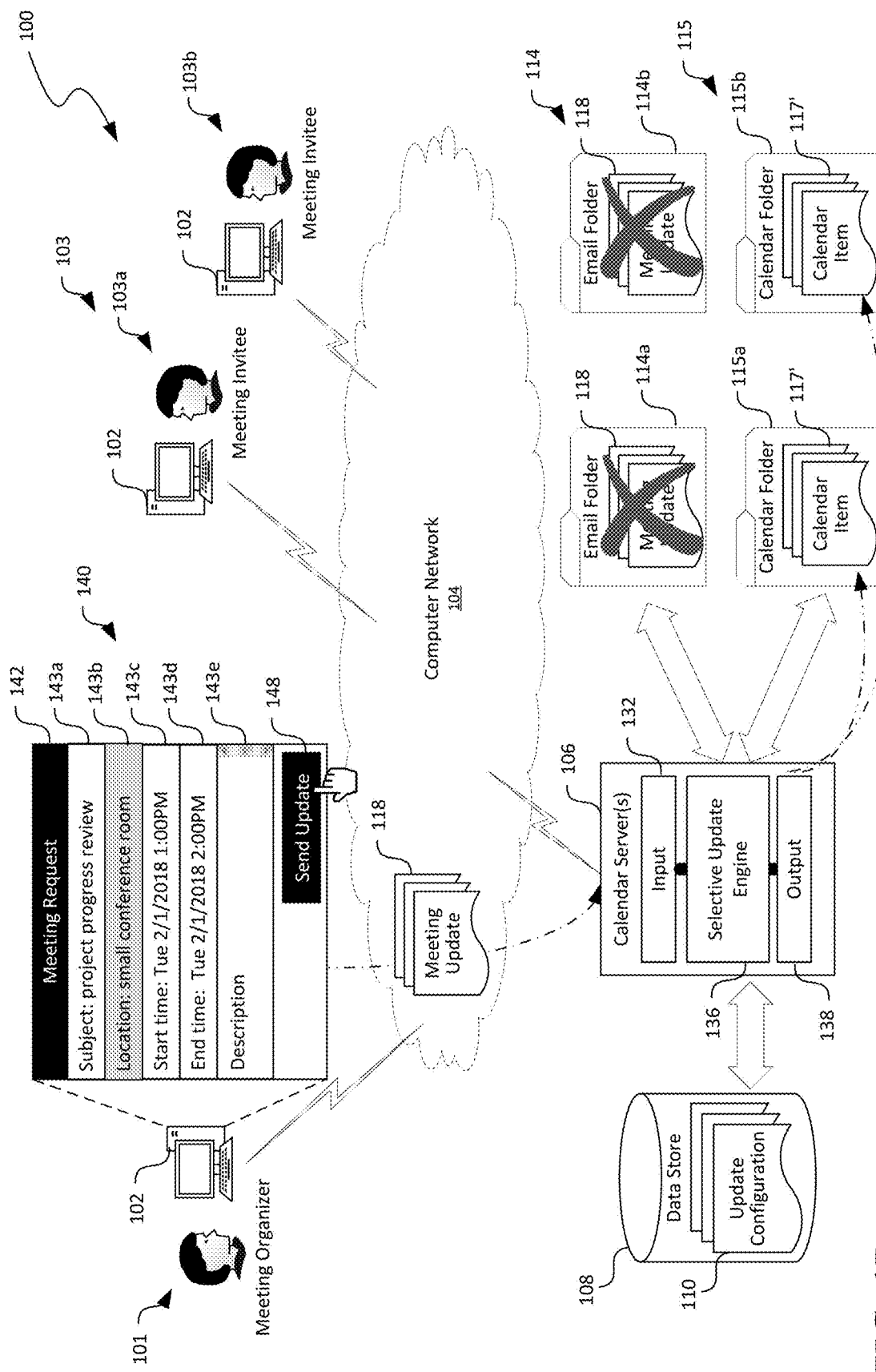

The calendar items 117 stored in the calendar folders 115 may be updated from time to time. For example, as shown in FIG. 1B, the meeting organizer 101 may decide to modify the description field 143e to replace, for instance, "to be provided" with "a quick review of progress on project dynamo." Upon receiving an actuation on the "Send Update" button 149, a meeting update 118 can be generated and transmitted to the calendar server 106. In FIG. 1B, particular modifications to the meeting request 116 (FIG.

1A) are shown for illustrations purposes. In other embodiments, additional and different modifications may also be accommodated, examples of which are described in more detail below with reference to FIGS. 1B-1D.

Upon receiving the meeting update 118, the input component 132 can perform the optional pre-processing described above and forward the meeting update 118 to the selective update engine 136 for selective automatic processing. In certain embodiments, the selective update engine 136 can be configured to determine whether the meeting update 118 is actionable by the meeting invitees 118 according to the update configuration 110 in the data store 108. In certain implementations, the meeting update 118 is actionable when the calendar server 106 needs input from the meeting invitees 103 in order to process the meeting update 118. For example, the meeting update 118 is actionable when the meeting update 118 specifically mentions or requests a meeting invitee 103 (e.g., the first meeting invitee 103a) for input. In another example, the meeting update 118 is actionable when one or more "critical" meeting details have been modified. Such critical meeting details can include, for instance, a start date/time, an end date/time, etc. The critical meeting details can be pre-configured by, for example, a system administrator, or can be configurable by the meeting invitees 103 or other suitable entities using a configuration interface. An example configuration interface is described below in more detail with reference to FIG. 2.

In the illustrated example in FIG. 1B, the selective update engine 136 can be configured to determine that the changes to the parameters or details of the meeting are not actionable because the changes only involve an update of the description field 143e. In response to determining that the meeting update 118 is not actionable, the selective update engine 136 can indicate and instruct the output component 138 to automatically update the corresponding calendar items 117 (FIG. 1A) in respective calendar folders 115 without input from the meeting invitees 103. For instance, corresponding description field 143e of the calendar items 117 can be modified from "to be provided" to "a quick review of work progress on project dynamo." Subsequently, the updated calendar items 117' can be stored in the respective calendar folders 115.

The selective update engine 136 can also be configured to automatically delete the received meeting update 118 from respective inboxes of the email folders 114 of the meeting invitees 103. For example, the selective update engine 132 can be configured to move the received meeting update to a "Deleted Items" folder, clear a new message flag of the meeting update 118, purge the meeting update 118 from the email folders 114, or perform other suitable operations such that the meeting update 118 would not be surfaced to the meeting invitees 103.

Several embodiments of the disclosed technology can thus improve efficiencies in updating calendar items 117 in the calendar folders 115 by filtering received meeting updates 118 according to one or more actionability criteria contained in the records of update configuration 110. When a meeting update 118 only contains a modification of non-critical meeting details, for instance, an update of the description field 143e, the selective update engine 136 can automatically incorporate the modifications in the stored calendar item 117 without input from the meeting invitees 103. Thus, a lack of capability to accept the meeting update 118 on the client devices 102 can be obviated. In addition, by automatically deleting at least some of the received meeting updates 118, several embodiments of the disclosed technology can reduce clutter in the inboxes of meeting invitees 103 as well as reducing workloads of corresponding email servers (not shown). As such, performance of email servers and/or corresponding email services can be improved.

Figure 1C:
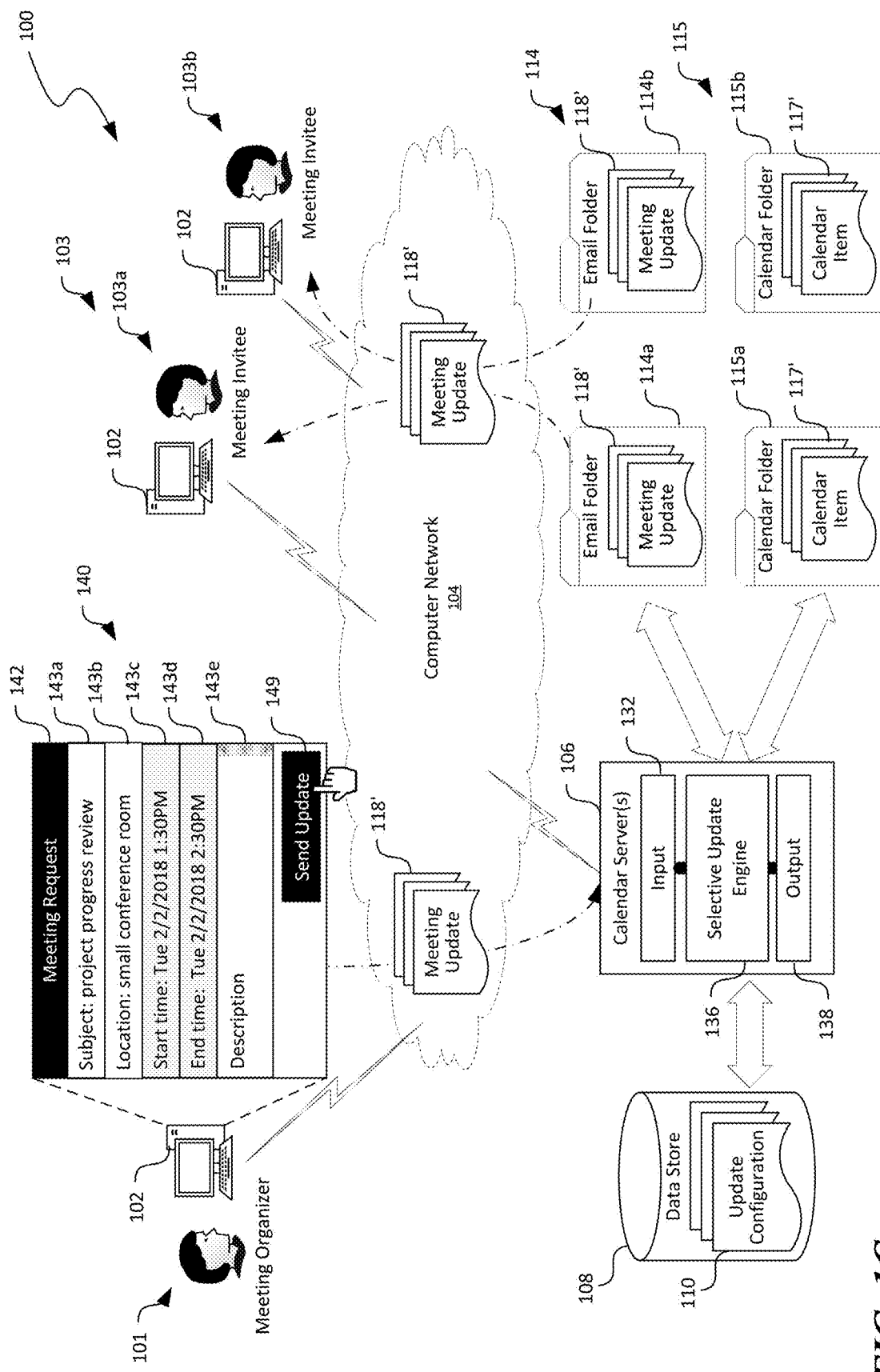

FIG. 1C illustrate another example in which modifications to the parameters or details of the meeting are deemed as actionable. For instance, as shown in FIG. 1C, the meeting organizer 101 may decide to modify the start time from "Tue Feb. 1, 2018 1:00 PM" to "Tue Feb. 2, 2018 1:30 PM;" and modify the end time from "Tue Feb. 1, 2018 2:00 PM" to "Tue Feb. 2, 2018 2:30 PM." In certain embodiments, such modifications may be deemed actionable because a system administrator have configured the update configuration 110 to indicate that when the start time or end time fields 143c and 143d are modified, such modifications are considered actionable. In other embodiments, the individual meeting invitees 103 may also configure the update configuration 110 to override or supplement the update configuration 110 by the system administer.

Upon the meeting organizer 101 actuates the "Send Update" button 149, the meeting update 118' with the modified values in the start/end time fields 143c and 143d can be generated and transmitted to the calendar server 106. Similar to the operations discussed above with reference to FIG. 1B, the input component 132 can then receive and forward the meeting update 118' to the selective update engine 136 for further processing. In the illustrated example, the selective update engine 136 can determine that the modifications of the parameters or details (i.e., the start/end times 143d and 143e) are related to actionable changes based on the update configuration 110. As such, the selective update engine 136 can indicate and instruct the output component 138 to forward the meeting update 118' to inboxes at the email folders 114a and 114b of the meeting invitees 103a and 103b, respectively, via the computer network 104.

Figure 1D:
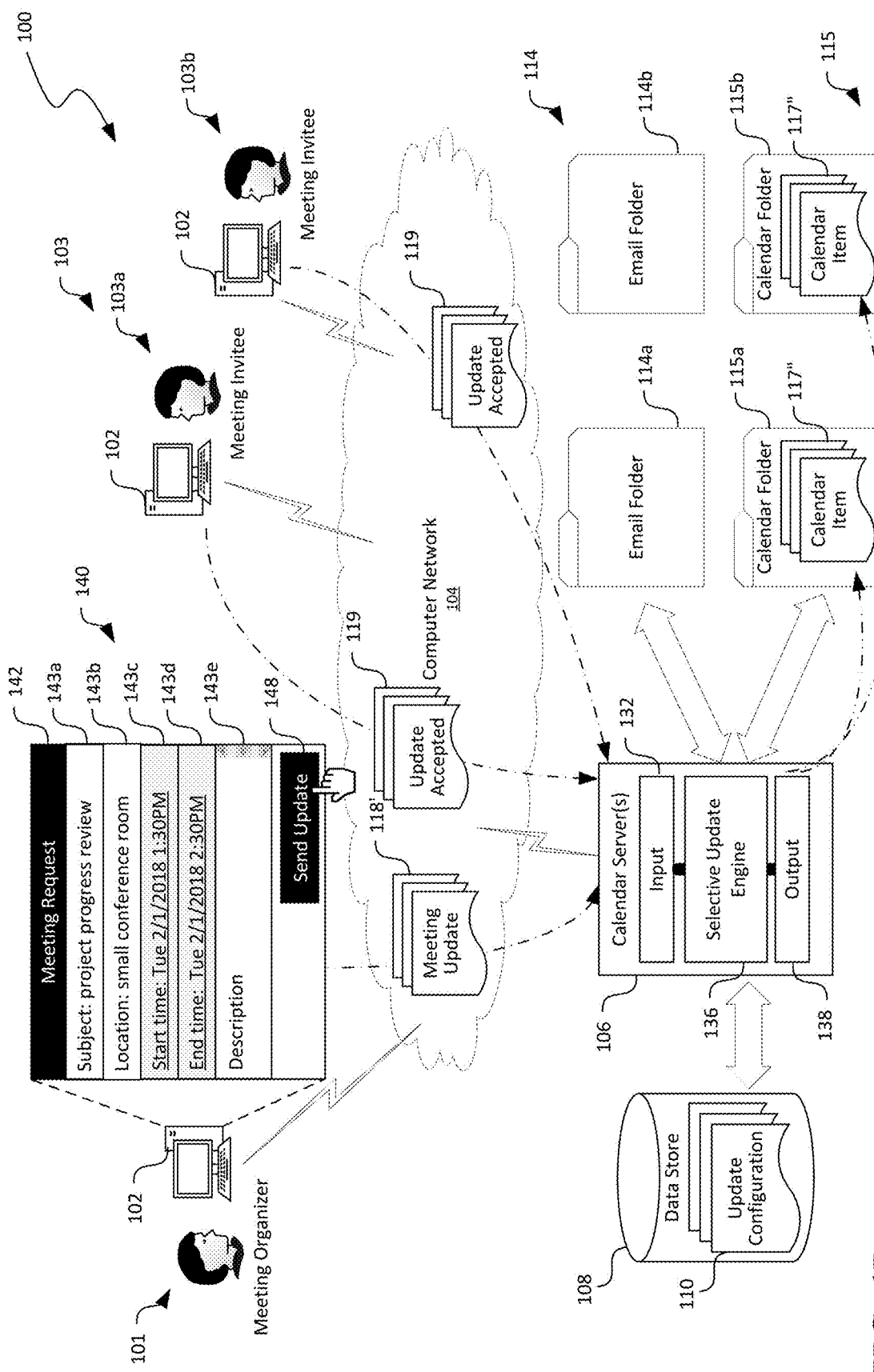

As shown in FIG. 1D, the meeting invitees 103 can then accept, reject, or otherwise provide input to the meeting updates 118'. In the illustrated example, both meeting invitees 103 accept the meeting update 118' and in response, the client devices 102 can generate and transmit notifications of update accepted 119 to the calendar server 106. Upon receiving the notifications of update accepted 119, the selective update engine 136 or other suitable components of the calendar server 106 can instruct the output component 138 to modify the calendar items 117 (FIG. 1A) in respective calendar folders 115 according to the input provide by the meeting attendees 103. The updated calendar items 117" can then be stored in the calendar folders 115.

Figure 2:
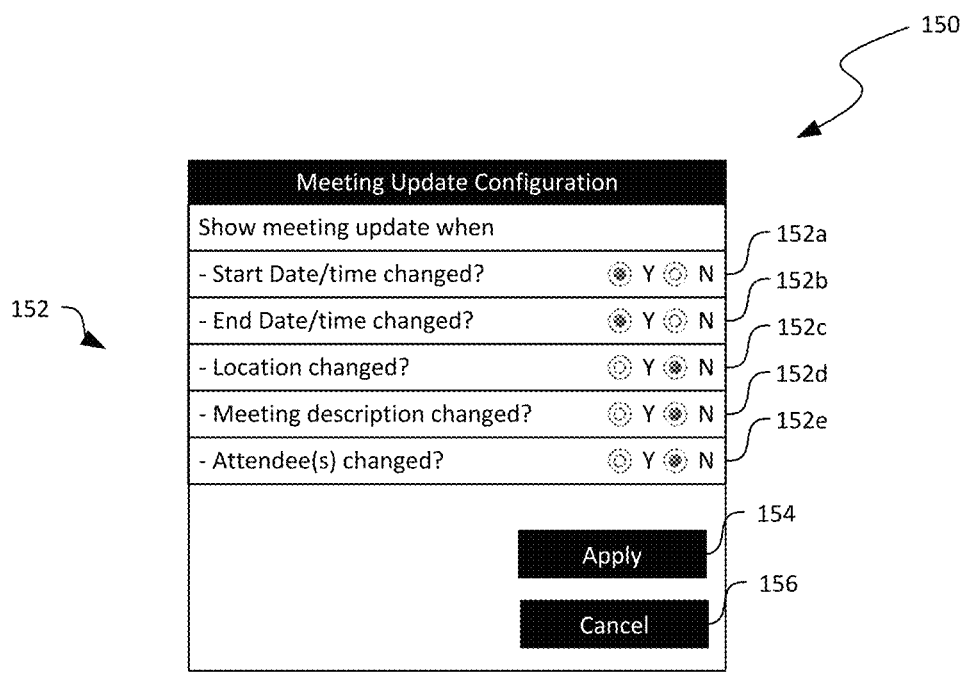
FIG. 2 is an example user interface suitable for configuring user-adjustable critical meeting details in accordance with embodiments of the disclosed technology.

FIG. 2 is an example configuration interface 150 for configuring records of update configurations 110 in FIG. 1A in accordance with embodiments of the disclosed technology. Though particular meeting parameters or details are shown in FIG. 2 for illustration, in other embodiments, the configuration interface 150 can include other suitable parameters, arrangements, conditions, or other suitable characteristics of a meeting. As shown in FIG. 2, the configuration interface can include multiple selection fields 152 configured to allow a system administrator or meeting attendee 103 (FIG. 1A) to designate changes to which parameters or details of a meeting are actionable. For instance, as shown in FIG. 2, the selection fields 152 can individually include a description and a pair of selection buttons marked "Y" or "N" for yes or no. In the illustrated example, the selection fields 152a and 152b corresponding to start date/time changed and end date/time changed are designed as actionable. In contrast, the selection fields 152c-152d corresponding to location changed, meeting description changed, and attendee(s) changed, respectively, are designated as non-actionable. The configuration interface 150 can also include one or more actuation elements such as the apply button 154 and cancel button 156.

In operation, a system administrator or meeting attendee 103 can provide input, for example, by clicking on the selection buttons, to one or more of the selection fields 152 to designate one or more of properties or details as actionable. The system administrator or meeting attendee 103 can then confirm any changes to the update configuration 110 by clicking on the apply button 154 or can cancel the changes by click on the cancel button 156.

Though FIG. 2 shows the configuration interface 150 as a graphical user interface, in other embodiments, the configuration interface 150 can include other suitable types of man-machine interface. For example, in some implementations, the update configuration 110 can be set by executing commands in a task automation and configuration management framework. One example of such a framework is PowerShell from Microsoft Corporation of Redmond, Washington. PowerShell provides a command-line shell and an associated scripting language. The following is an example PowerShell command for setting the update configuration 110:

Set-OrganizationConfig-VisibleMeetingUpdateProperties "Subject,Property1,Property2"-Id "FooOrg.com"

In the example command above, the instruction, i.e., "Set-OrganizationConfig" can be executed to set meeting updates with changes to subject properties as actionable for an example entity called "FooOrg."

Figure 3:
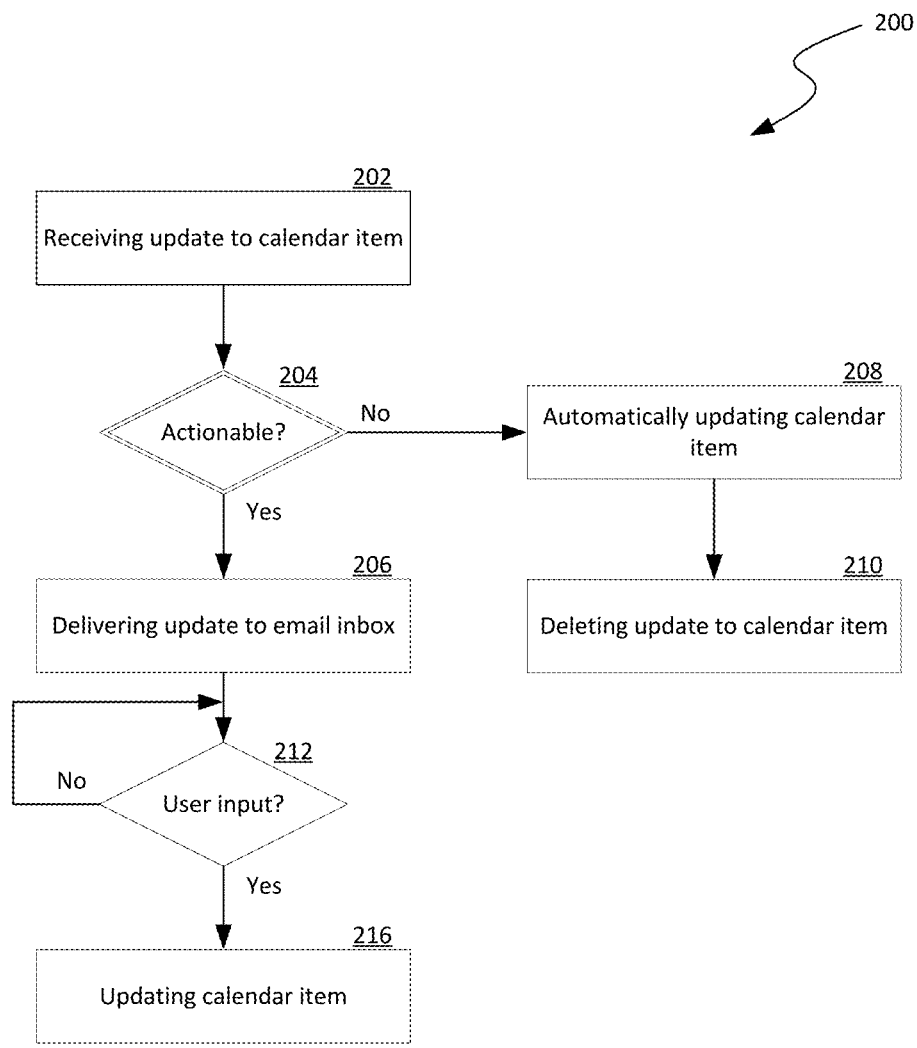
FIGS. 3 and 4 are flowcharts illustrating processes of selective update of calendar items in accordance with embodiments of the disclosed technology.
Figure 4:
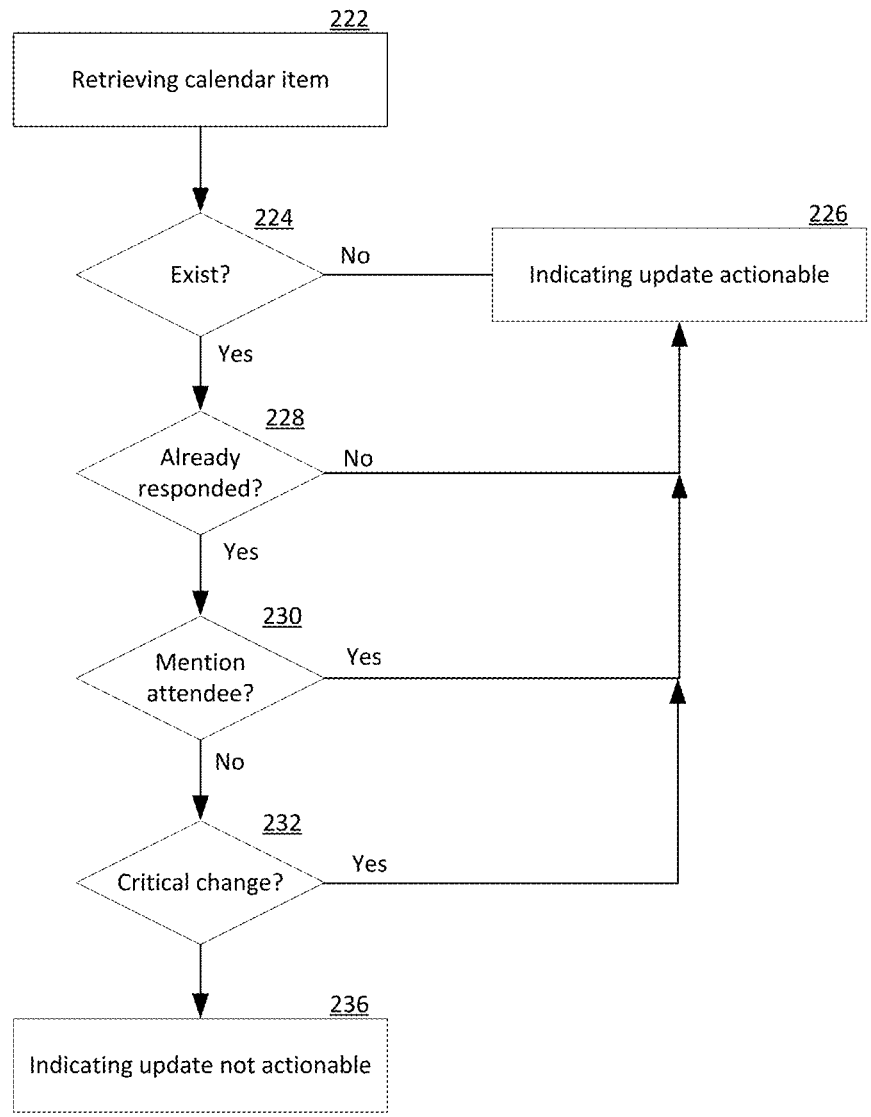

FIGS. 3 and 4 are flowcharts illustrating processes of selective update of calendar items in accordance with embodiments of the disclosed technology. Though the process is described in the context of the computing system 100 of FIGS. 1A-1D, embodiments of the process can also be implemented in other computing systems with additional and/or different components.

As shown in FIG. 3, a process 200 can include receiving an update to a calendar item at a server at stage 202. The update can include an electronic message containing one or more changes of one or more parameters or details to a meeting that a user is invited to attend. The process 200 can then include a decision stage 204 to determine whether the update is actionable by the user according to a set of pre-configured criteria individually representing conditions under which input from the user is needed to process the update at the server. In certain implementations, a meeting update is actionable when the server needs input from the meeting invitee in order to process the meeting update. For example, a meeting update is actionable when the meeting update specifically mentions or requests the user for input. In another example, a meeting update is actionable when one or more "critical" meeting details have been modified. Such critical meeting details can include, for instance, a start date/time, an end date/time, etc. The critical meeting details can be pre-configured by, for example, a system administrator, or can be configurable by the meeting invitees or other suitable entities. Example operations for determining whether the received update is actionable are described in more detail below with reference to FIG. 4.

The process 200 can then include delivering the received update to an email inbox of the user in response to determining that the update is actionable at stage 206. The process 200 can then include another decision stage 212 to determine whether a user input to the update has been received. In response to determining that a user input has been received, the process 200 proceeds to updating the calendar item according to the received user input at stage 216. Otherwise, the process 200 reverts to monitoring for user input. In response to determining that the update is not actionable, the process 200 can include automatically modifying the calendar item according to the received update without user input at stage 208. The process 200 can also include deleting the received update by, for example, moving the received meeting update to a "Deleted Items" folder of a user.

FIG. 4 is a flowchart illustrating example operations to determine whether a received update to a meeting is actionable in accordance with embodiments of the disclosed technology. As shown in FIG. 4, the operations can include retrieving a calendar item from, for instance, a calendar folder 115 (FIG. 1B) that corresponds to a received update at stage 222. The operations can then include a decision stage 224 to determine whether a calendar item corresponding to the received update already exists. In response to determining that a calendar item corresponding to the received update does not exist, the operations can include indicating that the received update is actionable at stage 226.

In response to determining that a calendar item corresponding to the received update does exist, the operations can include another decision stage 228 to determine whether the user has already responded to a meeting invitation corresponding to the calendar item. In response to determining that the user has not responded to a meeting invitation corresponding to the calendar item, the operations can proceed to indicating that the update is actionable at stage 226.

In response to determining that the user has responded to a meeting invitation corresponding to the calendar item, the operations can proceed to another decision stage 230 to determine whether the update mentions the user, for example, by name, email, alias, etc. In response to determining that the update mentions the user, the operations can proceed to indicating that the update is actionable at stage 226. In response to determining that the update does not mention the user, the operations can proceed to yet another decision stage 232 to determine whether a "critical" parameter or detail of the meeting has changed. As described above with reference to FIGS. 1A-2, a system administrator or the user can configure or pre-designate which parameters or details of a meeting are "critical" or actionable. In response to determining that a "critical" parameter or detail of the meeting has changed, the operations can proceed to indicating that the update is actionable at stage 226. In response to determining that the one or more changes included in the received update are not related to any "critical" parameter or detail, the operations can proceed to indicating that the received update is not actionable at stage 236.

Figure 5:
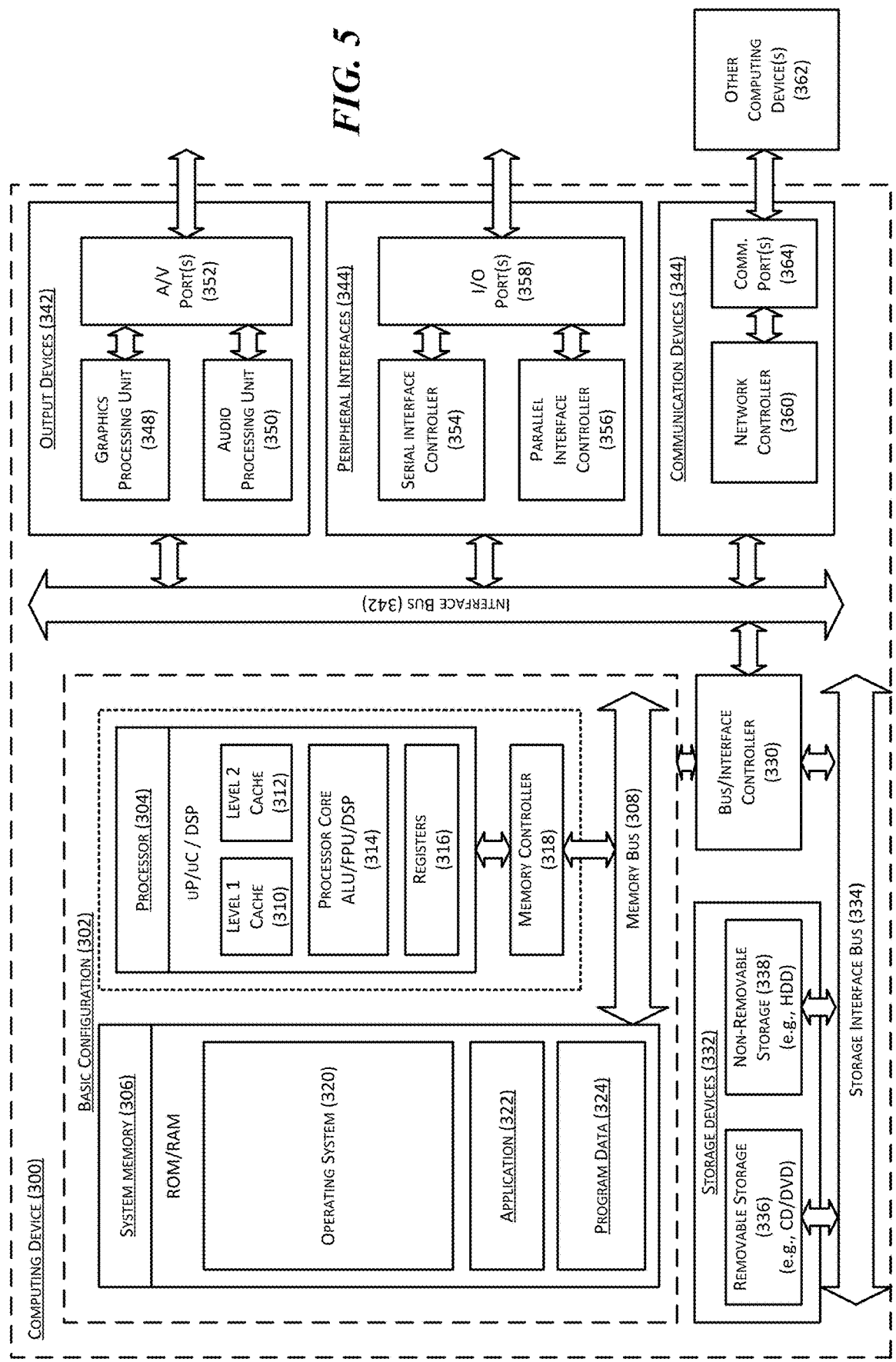
FIG. 5 is a computing device suitable for certain components of the electronic calendar system in FIGS. 1A-1D.

FIG. 5 is a computing device 300 suitable for certain components of the distributed computing system 100 in FIG. 1. For example, the computing device 300 can be suitable for the calendar server 106 or the client devices 102 of FIG. 1A. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

What is claimed is:

1. A method for selective update of calendar items in an electronic calendar system having a server interconnected to client devices by a computer network, the server providing an email folder and a calendar folder for a user, and storing data representing a set of pre-configured criteria individually identifying one of data fields of a calendar item of a meeting, an update of which corresponds to being actionable by the user, the method comprising:

receiving, at the server, an electronic message in the email folder of the user, the electronic message containing a digital data packet having data representing an update to one or more details of a meeting that the user is invited to attend and represented by the calendar item stored in the calendar folder, the calendar item having multiple data fields individually containing a value corresponding to a detail of the meeting; and upon receiving the electronic message containing the digital data packet having data representing the update, at the server:

identifying one or more of the data fields of the calendar item that contain values corresponding to the one or more details to be updated as indicated in update of the electronic message;

determining whether the update is actionable by the user according to the stored set of pre-configured criteria at the server by determining whether any of the identified one or more data fields of the calendar item are indicated in the set of pre-configured criteria as being actionable by the user upon change; and in response to determining that the update is not actionable according to the stored set of pre-configured criteria at the server:
    modifying, without input from the user, the values of the identified one or more data fields of the calendar item corresponding to the meeting in the calendar folder of the user in order to modify the one or more details of the meeting according to the update in the received electronic message; and
    automatically deleting the received electronic message representing the update without forwarding the electronic message to an inbox in the email folder of the user at the server.

2. The method of claim 1, further comprising:
upon receiving the update, at the server, in response to determining that the update is actionable, forwarding the electronic message representing the update to an inbox in the email folder of the user for further action.

3. The method of claim 1, further comprising:
upon receiving the update, at the server, in response to determining that the update is actionable:
    forwarding the electronic message representing the update to an inbox in the email folder of the user for further action;
    receiving input from the user to the update; and
    modifying the calendar item corresponding to the meeting in the calendar folder of the user at the server according to the received input from the user.

4. The method of claim 1 wherein determining whether the update is actionable by the user includes:
    determining whether the calendar item corresponding to the meeting already exists in the calendar folder of the user at the server; and
    in response to determining that the calendar item corresponding to the meeting does not exist in the calendar folder of the user at the server, indicating the update is actionable.

5. The method of claim 1 wherein determining whether the update is actionable by the user includes:
    determining whether the user has responded to a previous meeting invitation to the meeting; and
    in response to determining that the user has not responded to the previous meeting invitation to the meeting, indicating the update is actionable.

6. The method of claim 1 wherein determining whether the update is actionable by the user includes:
    determining whether the update specifically addresses the user for input; and
    in response to determining that the update specifically addresses the user for input, indicating the update is actionable.

7. The method of claim 1 wherein determining whether the update is actionable by the user includes:
    determining whether the user has responded to a previous meeting invitation to the meeting; and
    in response to determining that the user has responded to the previous meeting invitation to the meeting:
        comparing details of the calendar item in the calendar folder of the user to the one or more details in the update to generate a list of details that have changed;
        determining whether at least one from the generated list of details corresponds to a meeting property designated as actionable by the user; and
        in response to determining that at least one from the generated list of details corresponds to a meeting property designated as actionable by the user, indicating the update is actionable.

8. The method of claim 1 wherein determining whether the update is actionable by the user includes:
    determining whether the user has responded to a previous meeting invitation to the meeting; and
    in response to determining that the user has responded to the previous meeting invitation to the meeting:
        comparing details of the calendar item in the calendar folder of the user to the one or more details in the update to generate a list of details that have changed;
        determining whether at least one from the generated list of details corresponds to a meeting property designated as actionable by the user; and
        in response to determining that none from the generated list of details correspond to a meeting property designated as actionable by the user, indicating the update is not actionable.

9. The method of claim 1 wherein determining whether the update is actionable by the user includes:
    determining whether the user has responded to a previous meeting invitation to the meeting; and
    in response to determining that the user has responded to the previous meeting invitation to the meeting,
        determining whether the one or more details of the update include a start date, a start time, an end date, an end time, or a location of the meeting; and
        in response to determining that the one or more details include a start date, a start time, an end date, an end time, or a location of the meeting, indicating the update is actionable.

10. A computing device configured to be interconnected to one or more client devices by a computer network, the computing device comprising:
    a processor; and
    a memory operatively coupled to the processor, the memory containing an email folder and a calendar folder for a user, and data representing a set of pre-configured criteria according to which any meeting update is to be processed, the set of pre-configured criteria each identifying a data field of a calendar item modification which indicates that an input from the user is needed to process a corresponding meeting update in which a value of the data field is modified, and wherein the memory contains additional instructions executable by the processor to cause the computing device to:
        receive an electronic message in the email folder of the user, the electronic message containing a digital data packet having data representing an update to one or more details of a meeting that the user is invited to attend and represented by a calendar item stored in the calendar folder, the calendar item having multiple data fields individually containing a value corresponding to a detail of the meeting; and
        upon receiving the electronic message:
            identify one or more of the data fields of the calendar item that contain values corresponding to the one or more details to be updated as indicated in the update of the electronic message;
            determine whether the update is actionable by the user according to the set of pre-configured criteria by determining whether any of the identified one or more data fields of the calendar item are indicated in the set of pre- configured criteria as being actionable by the user upon change; and
        in response to determining that the update is not actionable according to the set of pre-configured criteria, automatically modify the values of the identified one or more data fields of the calendar item corresponding to the meeting in the calendar folder of the user according to the update to the one or more details contained in the received electronic message without input from the user.

11. The computing device of claim 10 wherein the memory contains additional instructions executable by the processor to cause the computing device to forward the electronic message to an inbox in the email folder of the user for further action in response to determining that the update is actionable.

12. The computing device of claim 10 wherein the memory contains additional instructions executable by the processor to cause the computing device to automatically delete the received electronic message without input from the user in response to determining that the electronic message is not actionable according to the set of pre-configured criteria.

13. The computing device of claim 10 wherein to determine whether the update is actionable by the user includes:
to determine whether the calendar item corresponding to the meeting already exists in the calendar folder of the user; and
in response to determining that the calendar item corresponding to the meeting does not exist in the calendar folder of the user, to indicate the update is actionable.

14. The computing device of claim 10 wherein to determine whether the update is actionable by the user includes:
to determine whether the user has responded to a previous meeting invitation to the meeting; and
in response to determining that the user has not responded to the previous meeting invitation to the meeting, to indicate the update is actionable.

15. The computing device of claim 10 wherein to determine whether the update is actionable by the user includes:
to determine whether the update specifically requests input from the user; and
in response to determining that the update specifically requests input from the user, to indicate the update is actionable.

16. The computing device of claim 10 wherein to determine whether the update is actionable by the user includes:
to compare details of the calendar item in the calendar folder of the user to the one or more details in the electronic message to generate a subset of the details that have changed;
to determine whether at least one from the generated subset of the details corresponds to a meeting property pre-designated as actionable; and
in response to determining that at least one from the generated subset of the details corresponds to a meeting property pre-designated as actionable, to indicate the update is actionable.

17. The computing device of claim 10 wherein to determine whether the update is actionable by the user includes:
to compare details of the calendar item in the calendar folder of the user to the one or more details in the electronic message to generate a subset of the details that have changed;
to determine whether at least one from the generated subset of the details corresponds to a meeting property pre-designated as actionable; and
in response to determining that none from the generated subset of the details corresponds to a meeting property pre-designated as actionable, to indicate the update is not actionable.

18. A method for selective update of calendar items in an electronic calendar system having a server interconnected to client devices by a computer network, the server providing an email folder and a calendar folder for a user, wherein the method comprising:
receiving, at the server, an electronic update in the email folder of the user, the electronic update containing a change to a parameter of a meeting that the user is invited to attend and represented by a calendar item stored in the calendar folder, the calendar item having multiple data fields individually containing a value representing a start date, a start time, an end date, an end time, a location, or a description of the meeting; and
in response to receiving the electronic update, at the server, identifying one of the data fields of the calendar item that contains a value corresponding to the parameter of the meeting having the change in the received electronic update;
determining whether the identified one of the data fields containing the value represents one of a start date, a start time, an end date, an end time, or a location of the meeting represented by a data object stored in the calendar folder; and
in response to determining that the identified one of the data fields containing the value does not represent one of the start date, the start time, the end date, the end time, or the location of the meeting, modifying, without input from the user, the calendar item corresponding to the meeting in the calendar folder of the user to update the value of the identified one of the data fields with the change to the parameter of the meeting according to the received electronic update.

19. The method of claim 18, further comprising in response to determining that the parameter having the change is not one of the start date, the start time, the end date, the end time, or the location of the meeting, automatically deleting the received electronic update without input from the user.

20. The method of claim 18, further comprising:
in response to determining that the parameter having the change is one of the start date, the start time, the end date, the end time, or the location of the meeting,
forwarding an electronic message representing the electronic update to an inbox in the email folder of the user for further action;
receiving input from the user to the update; and
modifying the calendar item corresponding to the meeting in the calendar folder of the user at the server according to the received input from the user.

* * * * *